US009824468B2

(12) United States Patent
Luo et al.

(10) Patent No.: US 9,824,468 B2
(45) Date of Patent: Nov. 21, 2017

(54) DICTIONARY LEARNING BASED IMAGE RECONSTRUCTION

(71) Applicant: General Electric Company, Schenectady, NY (US)

(72) Inventors: Jiajia Luo, Schenectady, NY (US); Bruno Kristiaan Bernard De Man, Clifton Park, NY (US); Ali Can, Niskayuna, NY (US); Eri Haneda, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 148 days.

(21) Appl. No.: 14/985,702

(22) Filed: Dec. 31, 2015

(65) Prior Publication Data
US 2017/0091964 A1 Mar. 30, 2017

Related U.S. Application Data

(60) Provisional application No. 62/234,064, filed on Sep. 29, 2015.

(51) Int. Cl.
*G06K 9/00* (2006.01)
*G06T 11/00* (2006.01)
*G06K 9/62* (2006.01)

(52) U.S. Cl.
CPC .......... *G06T 11/006* (2013.01); *G06K 9/6255* (2013.01); *G06K 9/6256* (2013.01); *G06T 11/008* (2013.01); *G06T 2210/41* (2013.01); *G06T 2211/421* (2013.01); *G06T 2211/424* (2013.01)

(58) Field of Classification Search
None
See application file for complete search history.

(56) References Cited

U.S. PATENT DOCUMENTS 7,327,822 B2 * 2/2008 Sauer ............... A61B 6/032
378/4
7,512,284 B2 * 3/2009 Avinash ............ G06T 5/002
382/260
(Continued)

FOREIGN PATENT DOCUMENTS

CN 103473745 A 12/2013

OTHER PUBLICATIONS

Erdogan et al., "Ordered subsets algorithms for transmission tomography", Phys Med Biol, 44(11), pp. 2835-2851, Nov. 1999.
(Continued)

*Primary Examiner* — Avinash Yentrapati
(74) *Attorney, Agent, or Firm* — Pabitra K. Chakrabarti

(57) ABSTRACT

A computationally efficient dictionary learning-based term is employed in an iterative reconstruction framework to keep more spatial information than two-dimensional dictionary learning and require less computational cost than three-dimensional dictionary learning. In one such implementation, a non-local regularization algorithm is employed in an MBIR context (such as in a low dose CT image reconstruction context) based on dictionary learning in which dictionaries from different directions (e.g., x,y-plane, y,z-plane, x,z-plane) are employed and the sparse coefficients calculated accordingly. In this manner, spatial information from all three directions is retained and computational cost is constrained.

20 Claims, 11 Drawing Sheets

(56) References Cited

U.S. PATENT DOCUMENTS

| | | | |
|---|---|---|---|
| 8,885,975 B2 | 11/2014 | Yu et al. | |
| 2007/0100223 A1 | 5/2007 | Liao et al. | |
| 2013/0343625 A1* | 12/2013 | Samsonov | G06T 11/005 382/131 |
| 2014/0169649 A1 | 6/2014 | Raupach et al. | |
| 2015/0146845 A1* | 5/2015 | Thibault | G06T 11/006 378/19 |
| 2015/0154766 A1* | 6/2015 | Goshen | G06T 3/4053 382/131 |
| 2015/0235360 A1* | 8/2015 | Zheng | G06K 9/46 382/128 |
| 2015/0242044 A1 | 8/2015 | Nam et al. | |
| 2015/0287223 A1* | 10/2015 | Bresler | G06T 11/006 382/131 |
| 2016/0005183 A1* | 1/2016 | Thiagarajan | A61B 5/055 382/131 |
| 2016/0055658 A1* | 2/2016 | Liang | G06T 11/006 382/131 |
| 2016/0253787 A1* | 9/2016 | Chen | G06T 5/002 |
| 2016/0314600 A1* | 10/2016 | Nguyen | G06T 11/003 |

OTHER PUBLICATIONS

Obi et al., "2.5-D simultaneous multislice reconstruction by series expansion methods from Fourier-rebinned PET data", Medical Imaging, IEEE Transactions on, vol. 19, Issue: 5, pp. 474-484, May 2000.

Wang et al., "Image quality assessment: from error visibility to structural similarity", Image Processing, IEEE Transactions on, vol. 13, Issue: 4, pp. 600-612, Apr. 2004.

Elad et al., "Image Denoising via Sparse and Redundant Representations Over Learned Dictionaries", Image Processing, IEEE Transactions on, vol. 15, Issue: 12, pp. 3736-3745, Dec. 2006.

Xu et al., "Low-Dose X-ray CT Reconstruction via Dictionary Learning", Medical Imaging, IEEE Transactions on, vol. 31, Issue: 9, pp. 1682-1697, Sep. 2012.

Fu et al., "Modeling and estimation of detector response and focal spot profile for high-resolution iterative CT reconstruction", Nuclear Science Symposium and Medical Imaging Conference (NSS/MIC), 2013 IEEE, pp. 1-5, Oct. 27-Nov. 2, 2013, Seoul.

Chen et al., "Artifact Suppressed Dictionary Learning for Low-Dose CT Image Processing", IEEE Transactions on Medical Imaging, vol. 33, No. 12, Dec. 2014, pp. 2271-2292.

* cited by examiner

DICTIONARY LEARNING BASED IMAGE RECONSTRUCTION

CROSS-REFERENCE TO RELATED APPLICATIONS

This application claims priority to U.S. Provisional Application No. 62/234,064, entitled "2.5D Dictionary Learning Based Computed Tomography Reconstruction", filed Sep. 29, 2015, which is herein incorporated by reference in its entirety for all purposes.

STATEMENT REGARDING FEDERALLY SPONSORED RESEARCH & DEVELOPMENT

This invention was made with Government support under contract number HSHQDC-14-C-B0048 awarded by the Department of Homeland Security. The Government has certain rights in the invention.

BACKGROUND

The subject matter disclosed herein relates to tomographic reconstruction, and in particular to the use of multi-dimensional dictionary learning algorithms.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through the target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

All reconstruction algorithms suffer from reconstruction artifacts such as streaks and noise. To reduce this artifacts, regularization based methods have been introduced. However, there are often trade-offs between computational-efficiency, dose, and image quality. Therefore, there is a need for improved reconstruction techniques, particularly in the low-dose imaging context.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the invention may encompass a variety of forms that may be similar to or different from the embodiments set forth below.

In one implementation, a reconstruction method is provided. In accordance with this method a set of projection data is acquired from a plurality of views around an imaged volume. An iterative reconstruction of the set of projection data is performed by solving an objective function comprising at least a dictionary-based term. The dictionary-based term employs dictionary learning that employs two or more dictionaries each comprising at least some two-dimensional image patches oriented in different directions. A reconstructed image is generated upon completion of the iterative reconstruction.

In a further implementation, a reconstruction method is provided. In accordance with this method a set of projection data is acquired from a plurality of views around an imaged volume. An iterative reconstruction of the set of projection data is performed by solving an objective function comprising at least a dictionary-based term. The dictionary-based term employs dictionary learning that employs at least one dictionary comprising two-dimensional image patches oriented in different directions. A reconstructed image is generated upon completion of the iterative reconstruction.

In another implementation, an image processing system is provided. In accordance with this implementation, the image processing system includes a memory storing one or more routines and a processing component configured to access previously or concurrently acquired projection data and to execute the one or more routines stored in the memory. The one or more routines, when executed by the processing component: perform an iterative reconstruction of a set of projection data by solving an objective function comprising at least a dictionary-based term, wherein the dictionary-based term employs dictionary learning that employs one or more dictionaries comprising two-dimensional image patches oriented in different directions; and generate a reconstructed image upon completion of the iterative reconstruction.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
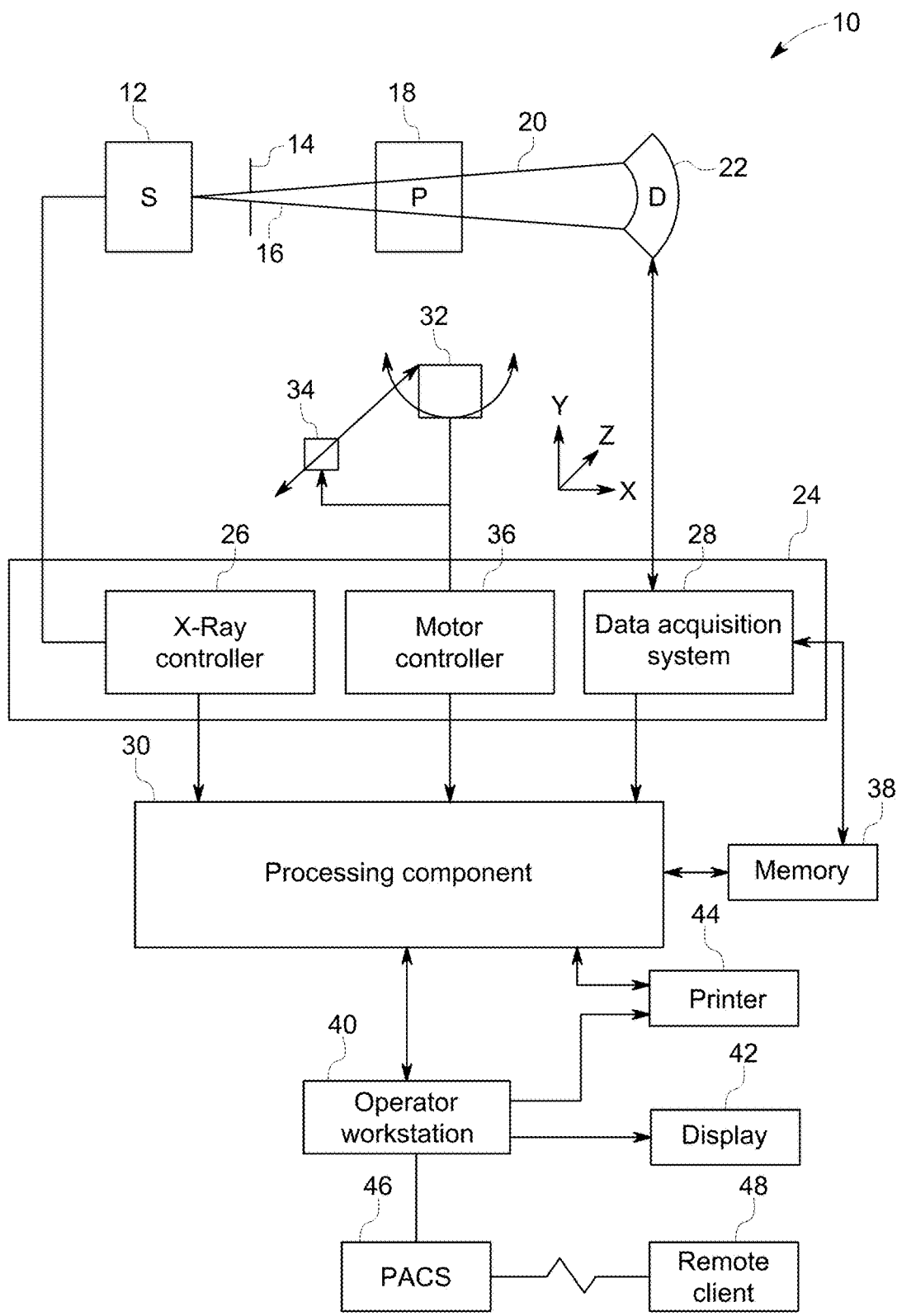
FIG. 1 is a block diagram depicting components of a computed tomography (CT) imaging system, in accordance with aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure While aspects of the following discussion are provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as the non-destructive inspection of manufactured parts or goods (i.e., quality control or quality review applications), and/or the non-invasive inspection of packages, boxes, luggage, and so forth (i.e., security or screening applications). In general, the present approaches may be desirable in any imaging or screening context in which high-resolution images are desirable.

One reconstruction technique used in CT imaging is iterative reconstruction. Use of iterative reconstruction techniques (in contrast to analytical methods) may be desirable for a variety of reasons. Such iterative reconstruction methods are based on discrete imaging models and provide a variety of advantages, such as being based on realistic modeling of the system optics, scan geometry, and noise statistics. As a result, iterative reconstruction techniques thus often achieve superior image quality, though at a computational cost. For example, model-based iterative reconstruction (MBIR) is a reconstruction technique which iteratively estimates the spatial distribution and values of attenuation coefficients of an image volume from measurements. MBIR is an optimization problem whereby a reconstructed image volume is calculated by solving an objective function containing both data fitting and regularizer terms which in combination control the trade-off between data fidelity and image quality. The data fitting (i.e., data fidelity) term minimizes the error between reconstructed result and the acquired data according to an accurate model that takes the noise into consideration. The regularizer term takes the prior knowledge of the image (e.g., attenuation coefficients that are similar within a small neighborhood) to reduce possible artifacts, such as streaks and noise. Therefore, MBIR is tolerant to noise and performs well even in low dose situation.

With respect to the regularizer, Total Variation (TV)-minimization algorithms are often used as a regularizer in MBIR. However, images reconstructed with this constraint may lose some fine features and cannot distinguish true structures and image noise. Recently, dictionary learning (DL) approaches have been applied as a regularizer for low-dose CT reconstruction due to the ability of this approach to keep local structures and reduce noise. For example, in the image prior term of the reconstruction function, a dictionary learning formula may be employed instead of a conventional function based on pairwise neighboring interaction. Thus, in such a scenario, the reconstruction function will have a data fidelity term and a dictionary learning-based prior modeling term.

With the preceding introductory comments in mind, the approaches described herein may be suitable for use with a range of image reconstruction systems that employ dictionary learning a part of the reconstruction. To facilitate explanation, the present disclosure will primarily discuss the present reconstruction approaches in one particular context, that of a CT system. However, it should be understood that the following discussion may also be applicable to other image reconstruction modalities and systems as well as to non-medical contexts or any context where an image is reconstructed from projections.

With this in mind, an example of a computer tomography (CT) imaging system 10 designed to acquire X-ray attenuation data at a variety of views around a patient (or other subject or object of interest) and suitable for performing image reconstruction using MBIR techniques is provided in FIG. 1. In the embodiment illustrated in FIG. 1, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 shapes or limits a beam of X-rays 16 that passes into a region in which a patient/object 18, is positioned. In the depicted example, the X-rays 16 are collimated to be a cone-shaped beam, i.e., a cone-beam, that passes through the imaged volume. A portion of the X-ray radiation 20 passes through or around the patient/object 18 (or other subject of interest) and impacts a detector array, represented generally at reference numeral 22. Detector elements of the array produce electrical signals that represent the intensity of the incident X-rays 20. These signals are acquired and processed to reconstruct images of the features within the patient/object 18.

Source 12 is controlled by a system controller 24, which furnishes both power, and control signals for CT examination sequences, including acquisition of two-dimensional localizer or scout images used to identify anatomy of interest within the patient/object for subsequent scan protocols. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 1, system controller 24 is coupled to a rotational subsystem 32 and a linear positioning subsystem 34. The rotational subsystem 32 enables the X-ray source 12, collimator 14 and the detector 22 to be rotated one or multiple turns around the patient/object 18, such as rotated primarily in an x,y-plane about the patient. It should be noted that the rotational subsystem 32 might include a gantry upon which the respective X-ray emission and detection components are disposed. Thus, in such an embodiment, the system controller 24 may be utilized to operate the gantry.

The linear positioning subsystem 34 may enable the patient/object 18, or more specifically a table supporting the patient, to be displaced within the bore of the CT system 10, such as in the z-direction relative to rotation of the gantry. Thus, the table may be linearly moved (in a continuous or step-wise fashion) within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols and to process acquired data. For example, the system controller 24, via the systems and controllers noted above, may rotate a gantry supporting the source 12 and detector 22 about a subject of interest so that X-ray attenuation data may be obtained at one or more views relative to the subject. In the present context, system controller 24 may also include signal processing circuitry, associated memory circuitry for storing programs and routines executed by the computer (such as routines for executing image processing techniques described herein), as well as configuration parameters, image data, and so forth.

In the depicted embodiment, the image signals acquired and processed by the system controller 24 are provided to a processing component 30 for reconstruction of images in accordance with the presently disclosed algorithms. The processing component 30 may be one or more general or application-specific microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for image reconstruction, as described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

The system of FIG. 1 may be utilized to acquire X-ray projection data for a variety of views about a region of interest of a patient to reconstruct images of the imaged region using the projection data. In particular, projection data acquired by a system such as the imaging system 10 may be iteratively reconstructed using a 2.5D (i.e., multi-direction 2D) dictionary learning-based iterative reconstruction as discussed herein.

As noted above, dictionary learning approaches may be desirable for use in iterative reconstruction approaches due to their de-noising effects not being based on local voxel values, unlike other approaches that use neighboring voxel values to suppress noise. Instead dictionary learning approaches look for similar or common regions in a given data set or reference volume to build the "dictionary", which is thus non-local in nature and can be used to identify common or repeated structures and to de-noise based on the known structural similarities. In this manner dictionary learning enables local image blocks to fit to a representation using a few elements (i.e. the "atoms" described below) from an overcomplete dictionary to capture or describe structures.

Figure 2:
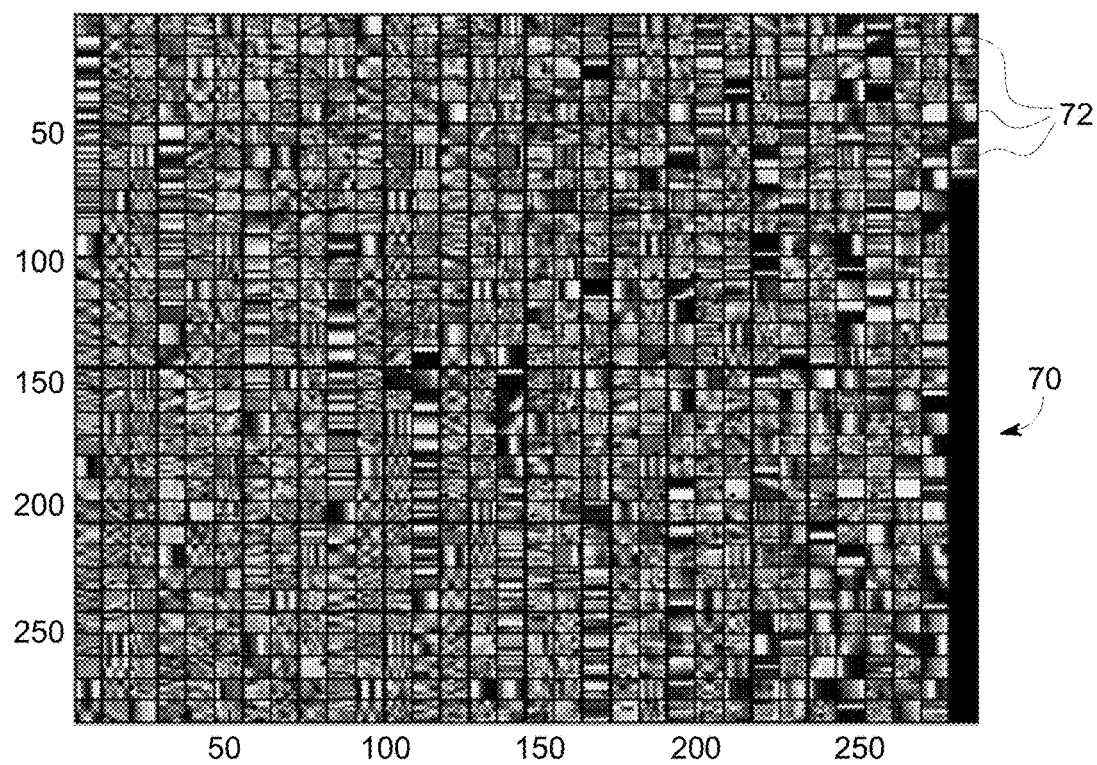
FIG. 2 depicts an example of a dictionary for use in a dictionary learning approach, in accordance with aspect of the present disclosure.

As used herein, a dictionary is a collection of "atoms", where each atom is a learned image patch, as discussed in greater detail below. An example of a dictionary 70 is shown in FIG. 2. A dictionary 70 consists of a collection of atoms 72. Each atom 72 is a column in the dictionary 70 and image patches used to learn such a dictionary 70 can be represented by the linear combination of such atoms 72, with a small number of atoms having non-zero coefficients. An image patch in such a context is a relatively small image such as, for example, an 8×8 image. In order to learn the dictionary 70 (as discussed in greater detail below), image patches can be sampled from the original patient/object images or from other sources, such as reference images.

In such dictionary learning approaches, local image blocks from an acquired image are described by a linear sum of learned atoms 72 (image blocks containing or depicting basic structural elements or features). The coefficients of this linear expression are referred to as sparse coefficients ($\alpha_s$), since only a sparse number of them are non-zero. Conceptually, the atoms 72 constitute the words or basic patterns of the dictionary 70 to which regions in an iteratively processed image are compared or decomposed into as part of the regularization process. In this sense, dictionary learning assumes sparse representation (as denoted by sparse representation coefficient $\alpha_s$) of signals (i.e., images). Using an overcomplete dictionary 70 (denoted as D herein) of constituent image features or components, signals are described by sparse linear combinations of the dictionary elements (i.e., atoms 72).

Figure 3:
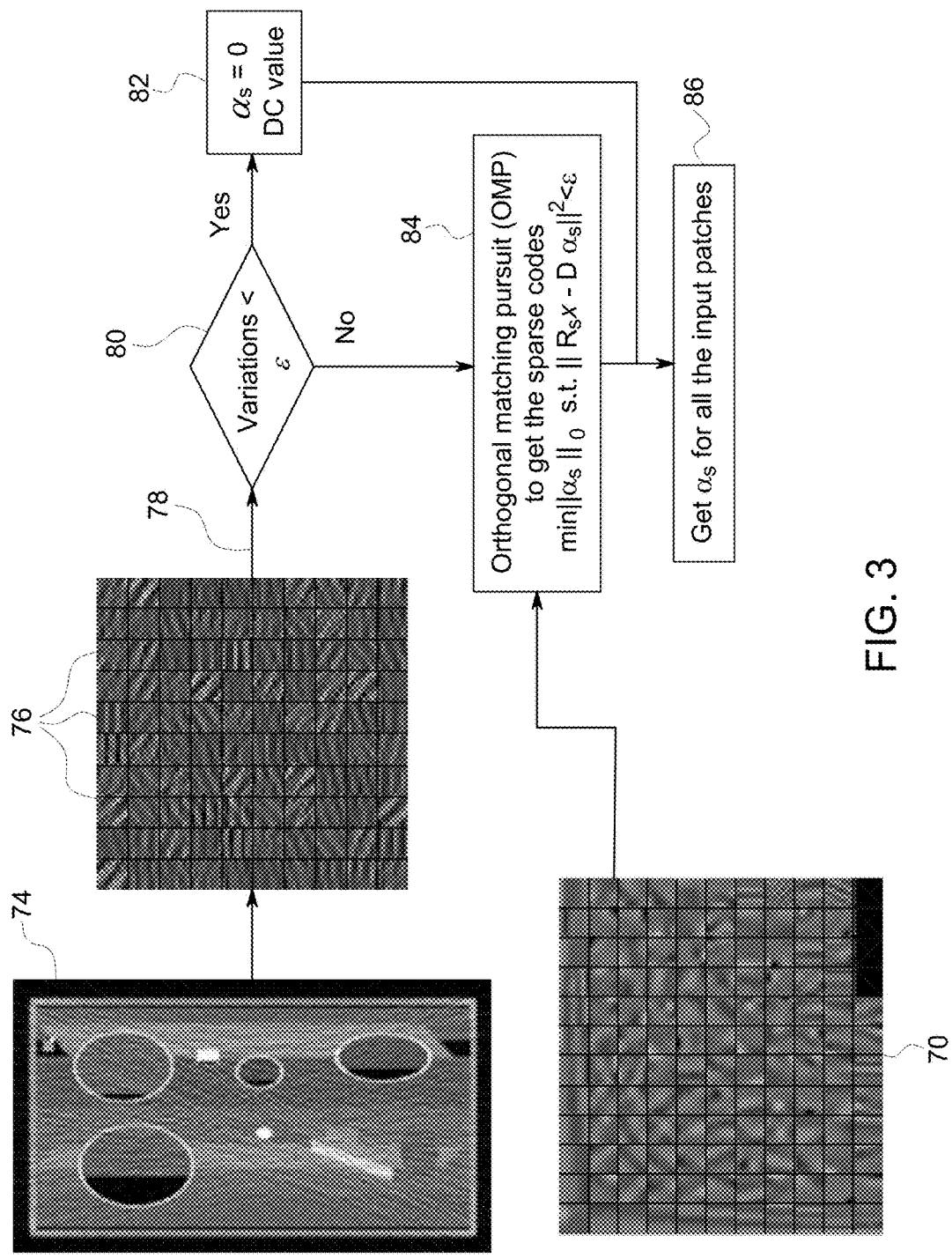
FIG. 3 depicts a process flow for a sparse coding process by which sparse representation coefficients are estimated, in accordance with aspect of the present disclosure.

By way of example, in operation dictionary learning may attempt to minimize the number of non-zero sparse representation coefficients and/or minimize the fitting error between extracted local patches of a sampled image and the corresponding dictionary representations. That is, in a dictionary learning implementation, the algorithms may attempts to minimize the number of unmatched region and to minimize the fitting error of modeled patches. A high level example of sparse coding by which sparse representation coefficients $\alpha$ may be estimated for an input image (x) 74 using a dictionary (D) 70 is shown in FIG. 3. In this example, local image patches $R_s$ 76 (e.g., non-overlapping image patches) are extracted and the mean value (DC) is extracted (step 78) from each patch 76. A determination (decision block 80) is then made for each patch 76 whether the variation is less than ε or greater than or equal to ε. If less than ε, the sparse coefficient $\alpha_s$ is 0 (step 82) (i.e., the variation is encompassed by the DC value). If greater or equal than ε, orthogonal matching pursuit (OMP) is used (step 84) to obtain the sparse coefficients $\alpha_s$ in accordance with:

$$\min \|\alpha_s\|_0 \qquad (1)$$

subject to $$\|R_s x - D\alpha_s\|^2 \le \epsilon \qquad (2)$$

where $\alpha_s$ is the sparse representation coefficient, $R_s$ is a local image patch extracted at pixel s, D is an overcomplete dictionary, x is the input image, and ε is target error. The sparse representation coefficients $\alpha_s$ are determined (step 86) to all input patches 76.

Figure 4:
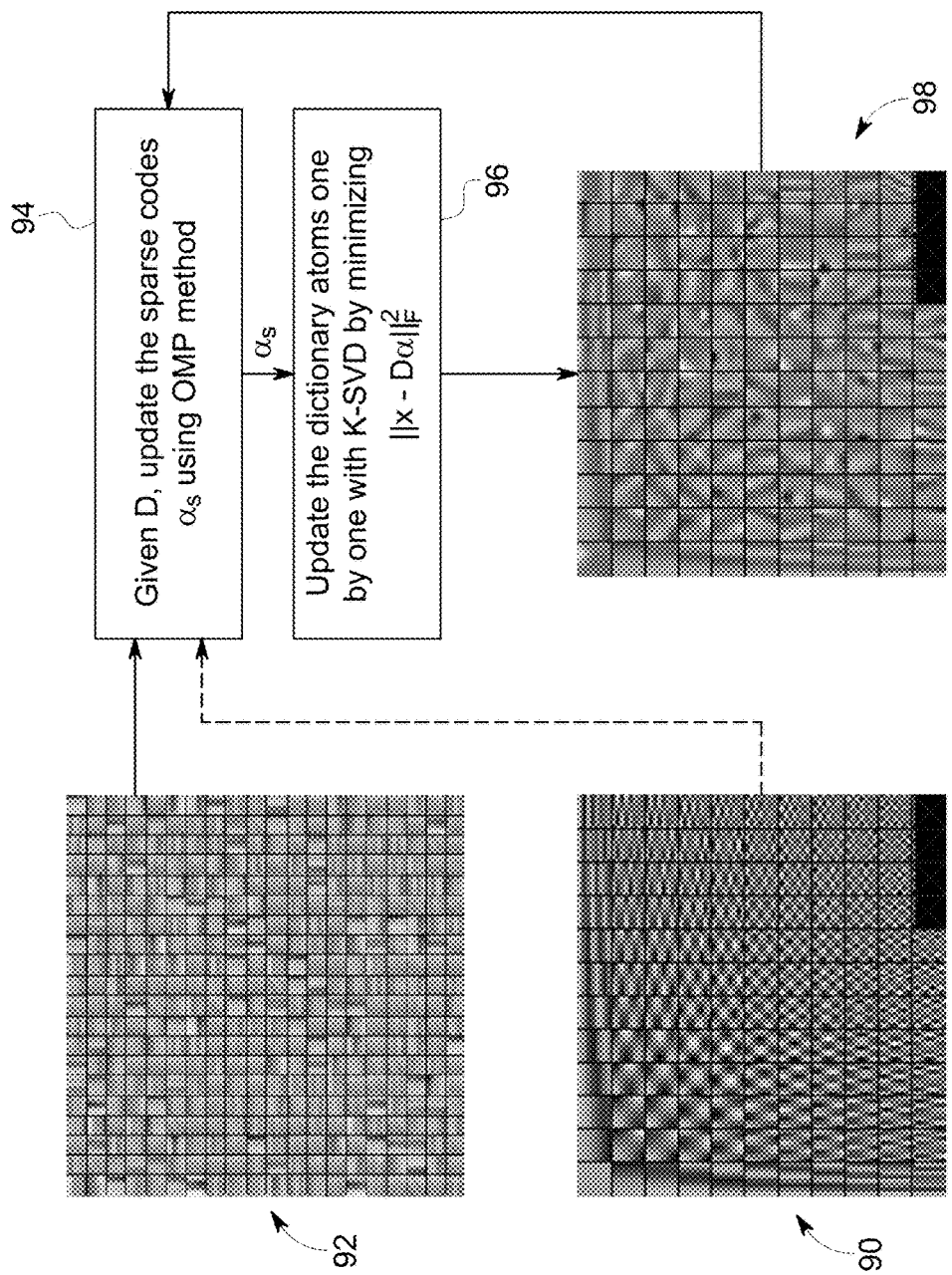
FIG. 4 depicts a dictionary training process flow, in accordance with aspect of the present disclosure.

The sparse representation coefficients $\alpha_s$ determined as shown in FIG. 3 may be used as part of a dictionary training process as shown in FIG. 4, which may be an aspect of the dictionary learning approaches discussed herein. As shown in FIG. 4, a dictionary D 70 as used herein may be trained (such as using the K-SVD algorithm) as part of an initial and/or ongoing part of the dictionary learning process. This training stage is based on assumption that all the patches can be linear represented by the column (atom) in the dictionary with only a sparse number of atoms having a non-zero coefficient. This is the shown in equation (3)

$$\min_{D,\alpha} \sum_s \|E_s \mu - D\alpha_s\|_F^2 + \sum_s \lambda \|\alpha_s\|_0 \qquad (3)$$

where parameter λ controls the sparsity of the learned coefficients $\alpha_s$. In one implementation, the K-SVD algorithm may be used to learn the dictionary and calculate the sparse coefficients.

In the depicted example of FIG. 4, the dictionary training process involves providing both an initial dictionary (Discrete Cosine Transform (DCT)) 90 and a set of collected image patches 92 (e.g., 8×8 image patches) for training from which the mean value (DC) has been extracted. Based on the image patches 92 and initial dictionary 90, the sparse codes $\alpha_s$ are updated, such as using the OMP method described above, at step 94. Based on the updated $\alpha_s$, the initial dictionary atoms may be updated (step 96) one by one, such as by minimizing:

$$\|x - D\alpha\|_F^2 \qquad (4)$$

to generate the updated dictionary 98. Keeping in mind the above, the described sparse coding and dictionary learning approaches may be used with the present approaches as part of both developing and/or updating the dictionaries employed.

Conventional dictionary learning processes typically employ two-dimensional (i.e., 2D) dictionary learning since the image blocks employed are two-dimensional and run in the same direction. One would expect that performance may be improved by incorporating spatial information across slices. The intuitive solution would be to crop three-dimensional (3D) patches to train the dictionary, and calculate the sparse coefficients for each three-dimensional patch later. Such a process may be characterized as three-dimensional dictionary learning. However, computational cost for three-dimensional dictionary learning is significantly higher than what is required for two-dimensional dictionary learning since the patch sizes are larger and dictionary atoms are larger as well. In addition, 3D sampling schemes will generate more patches than would be needed to calculate the sparse codes than in the 2D case, making the computational cost high for the 3D case.

With this in mind, certain implementations of present approach utilize a non-local dictionary-based algorithm (such as a regularization term) in an MBIR context (such as in a low dose CT image reconstruction context) based on "2.5-dimension" dictionary learning in which 2D dictionaries from different directions (e.g., x,y-plane, y,z-plane, x,z-plane) are employed and the sparse coefficients calculated accordingly. In this manner, spatial information from all three directions is retained. Since 2D dictionaries are of much smaller size than a 3D dictionary, and the number of patches generated in 2.5D case will be much less than 3D, the computational cost can be reduced.

Figure 5:
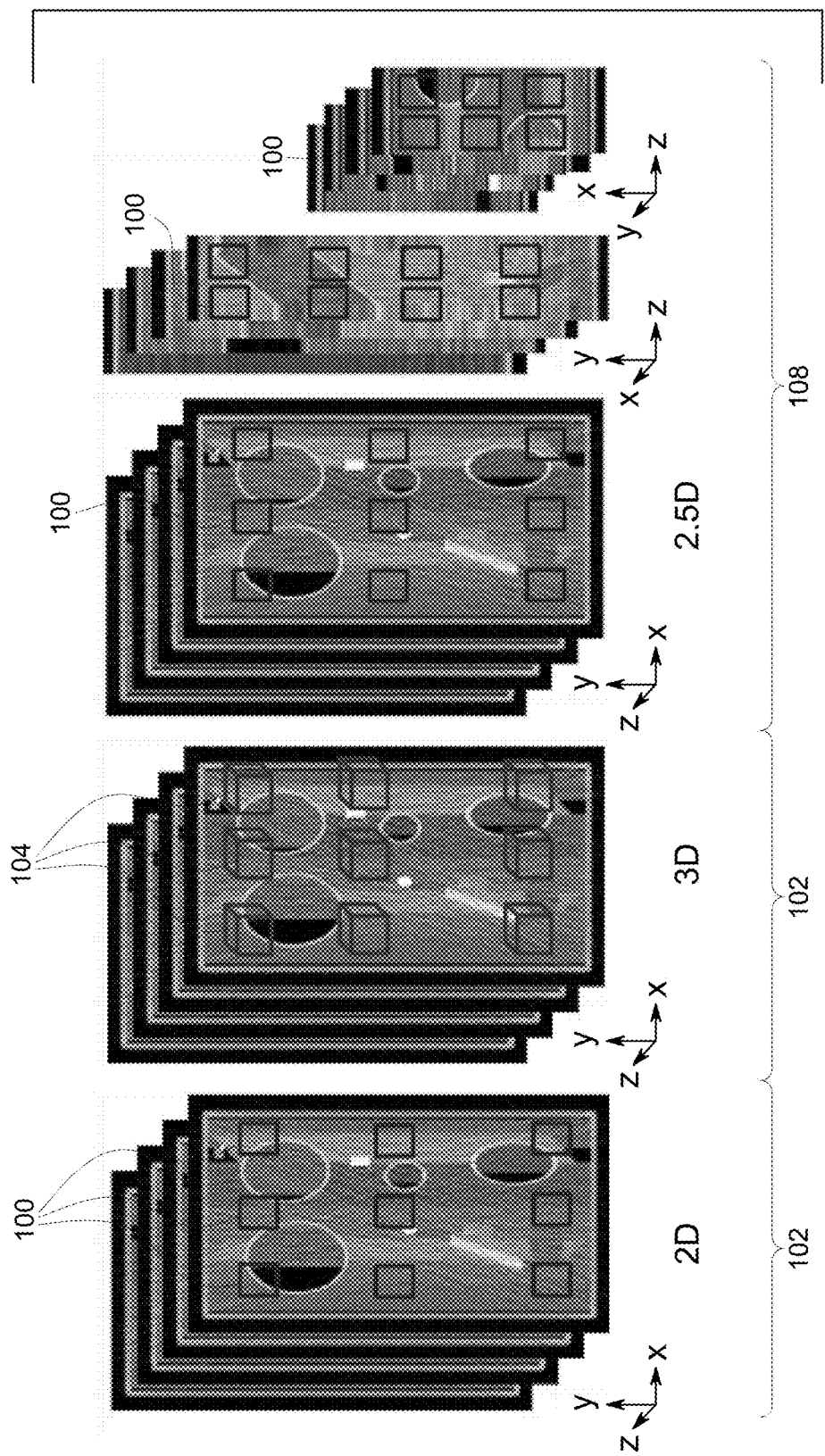
FIG. 5 depicts example of images and sample patches used in respective 2D, 3D, and 2.5D dictionary learning approaches, in accordance with aspect of the present disclosure.

By way of further illustration, given an image volume, the volume can be viewed from three directions: e.g., front to back, top to bottom, and left to right, with each direction corresponding to one of dimensions x, y, or z. For any point in the image volume there are three two-dimensional (i.e., planar) image blocks that cross this respective point. As discussed herein, in certain implementations two-dimensional image blocks are cropped from each direction, and the reconstructed image will fuse results from different directions. The difference among the atoms (i.e., image sub-regions) used in two-dimensional (2D) dictionary learning using images 102 taken in one dimension, in three-dimensional (3D) dictionary learning using cuboid images 102, and in 2.5D dictionary learning using images 108 found in three directions are shown in FIG. 5. As shown in FIG. 5 with respect to images 108 viewed associated with different directions, the structures of images seen from different directions as well as the number of slices in different directions are distinctive, which make the computational cost for each direction different, though far less than the 3D scenario while still retaining substantial information in multiple directions. Further, as shown with respect to images 108, images from different directions are visually distinctive, which demonstrates the value of adding spatial information across different directions. In the 2.5 D scenario, multiple 2D dictionaries are employed, with different dictionaries corresponding to different (e.g., orthogonal) directions so as to retain some or all of the distinctive spatial information found in different directions. It may be noted that, while the three directions shown in FIG. 5 for the 2.5D approach are orthogonal directions, in other implementations the differing directions need not be orthogonal to one another. For example, in one implementation the differing directions may instead be based on locally identified contours that may be used as normative surfaces which allow a gradient or contour to be locally followed. One advantage to orthogonal directions, however, is that data redundancy is reduced or minimized.

In this manner, three-dimensional spatial information is kept to a great extent and the computational cost is less than what is required for three-dimensional dictionary learning. In addition, as discussed herein the parameters for dictionary learning can vary for different directions (i.e., the dictionary learning parameters may be different for one or more of the dimensions), which allows flexibility of the reconstruction process.

By way of explaining the present approach, three different implementations are described, though it should be appreciated that the described implementations are merely provided to facilitate explanation and not as limiting examples. In a first implementation, three separate dictionaries D 70 are trained and used, each dictionary corresponding to different directions within the imaged volume (e.g., x,y; y,z; x,z and so forth) and consisting of two-dimensional image blocks (e.g., 8×8 blocks) cropped from different directions. As for computational cost, a process corresponding to this first example will typically needs to work on more 2D patches than conventional two-dimensional dictionary learning which works on single direction. However, three-dimensional dictionary learning would require three-dimensional image blocks (e.g., 8×8×8) for learning, and the learned dictionary are of larger size since the input is larger. In addition, in the three-dimensional case, a greater number of patches would need to be processed. Thus, a process corresponding to the first example would still be more computationally efficient than a three-dimensional dictionary learning approach for the same volume. In particular, experimental results suggest that the three-dimensional approach would be approximately ten times slower than the two-dimensional approach.

The second implementation uses a single dictionary but includes "atoms" (i.e., included image sub-regions corresponding to common structure, textures, or features) learned from different directions. In this case, the dictionary can be learned just once, which will save learning time, and will encompass atoms found in all three directions. Although in one implementation the learned dictionary is fixed at one, it is also possible to use different parameters in different directions to guarantee the adaptation of data from different directions based on the learned dictionary. In this case, the computational cost will be less than the first approach described above, and the reconstruction accuracy can be ensured.

The third implementation is to learn a dictionary containing both common atoms (observed in multiple or all directions) and particular atoms (observed in only one or less than all directions). In particular, common atoms are learned from different directions and those atoms are shared by all the directions. The particular atoms are learned separately for each direction, which capture the specificity of local structures of images in different directions. One advantage of this solution is that a compact dictionary can be learned, which can further save computational cost.

With the preceding example implementations in mind, and as discussed above, the present methodology incorporates dictionary learning as part of an iterative reconstruction term, such as a regularization term. For example, in the context of MBIR, the objective function of MBIR contains both a data fitting term and a regularization term. Dictionary learning may be added as a regularizer (or other suitable term) to improve the quality of reconstructed images since it maintains local structures and reduces noise. Therefore, the reconstructed image volume x can be calculated by solving the following objective function:

$$\hat{x} = \underset{x \geq 0}{\operatorname{argmin}} \left\{ \|y - Ax\|_w^2 + \beta \left( \sum_s \|E_s n - D\alpha_s\|^2 + \sum_s \lambda \|\alpha_s\|_0 \right) \right\} \quad (5)$$

where y is projection data, A is a forward projection matrix and w is a data weighting matrix. The term $E_s$ is a matrix operator to extract the s-th block. The matrix $D \in R^{f \times T}$ is a dictionary which can be learned globally or adaptively (as discussed in greater detail below), and $\alpha_s \in R^T$ is a sparse coefficient vector with sparse non-zero elements.

In the present approaches, an ordered subsets separable paraboloidal surrogate (OS-SPS) method may be used to solve the optimization problem, and the j-th image pixel $x_j$ is updated iteratively as:

$$x_j^{n+1} = x_j^n - \frac{M \sum_{i \in S_m} w_i a_{ij}([Ax^n]_i - y_i) + \beta \sum_s \sum_{p=1}^P e_{pj}^s ([E_s x^n]_p - [D\alpha_s]_p)}{\sum_i \left( w_i a_{ij} \sum_{k=1}^J a_{ik} \right) + \beta \sum_s \sum_{p=1}^P e_{pj}^s \sum_{k=1}^N e_{pk}^s} \quad (6)$$

where M denotes the number of subsets, $p \in [1, \ldots, P]$ is an index of an image block and $e^s_{pj}$ is an element of $E_s$. The dictionary component in the numerator of Equation (5) helps to summarize the reconstruction error by using the dictionary and sparse coefficients, while the dictionary part in the denominator is the counting of the frequency of the j-th pixel that has been selected for sparse coding. The dictionary D can be learned offline by using patches from a noise free image volume, and such learning scheme may be referred to as global dictionary learning. In contrast, the dictionary can also be updated online during the iterative reconstruction process, which is referred to as adaptive dictionary learning.

According to how patches are cropped for dictionary learning and sparse coding, the dictionary learning implementation can be characterized as two-dimensional or three-dimensional respectively or, in the present approach, multi-two dimensional. Turning back to FIG. 5 above, this figure shows examples of using different shapes of patches 100 for dictionary learning. For two-dimensional dictionary learning (leftmost example) each slice (stacked in the z direction in FIG. 5) can be independently processed and thus can be easily parallelized. For three-dimensional dictionary learning (center example), the patches are cropped three-dimensional cuboids 104 that are sampled and processed, which is more time consuming than sampling and processing two-dimensional samples 100 since more patches with higher dimension need to be processed.

Turning to the rightmost example, in order to speed up the process and retain useful spatial information, the present 2.5D dictionary learning scheme applies two-dimensional dictionary learning on each direction (x, y, and z) respectively as shown in FIG. 5. The cropped two-dimensional patches 100 from different directions are distinctive, demonstrating the value of incorporating three-dimensional information in dictionary learning. As for the computational cost, as noted above, processing three directions in 2D instead of one direction results in approximately three times the computational cost compared to the baseline 2D dictionary learning scenario, assuming that all parameter settings are the same for each direction and number of slices in each direction is also the same. In addition, many regions are flat in some directions and thus can be approximated by their average values to save computational cost even more. The objective function of the proposed algorithm is:

$$\hat{x} = \underset{x \geq 0}{\mathrm{argmin}} \left\{ \|y - Ax\|_W^2 + \beta \sum_{i=x,y,z} \left\{ \sum_s \|E_s^i x - D^i \alpha_s^i\|^2 + \sum_s \lambda^i \|\alpha_s^i\|_0 \right\} \right\} \quad (7)$$

where the superscript i corresponds to the direction x,y,z. In this example, it can be seen that there are three dictionaries for three directions, which increases the flexibility on parameter selection in each direction. However, as noted above, in other scenarios or implementations, less than three dictionaries may be employed while still incorporating multi-directional data.

Figure 6:
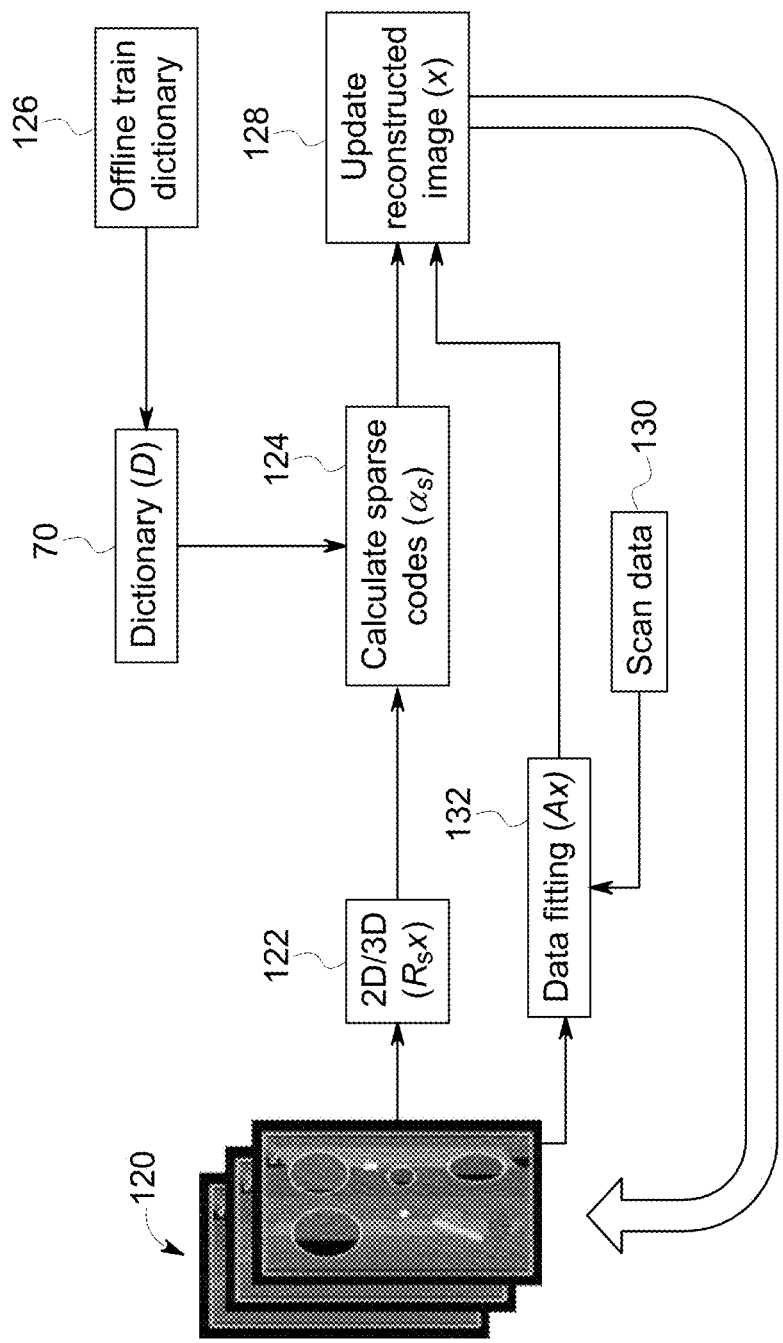
FIG. 6 depicts a process flow corresponding to an iterative reconstruction using a global dictionary, in accordance with aspect of the present disclosure.

As noted above, generating dictionaries can involve processing one or more images (e.g., reference images) to identify common patches (i.e., atoms) that may be base structures in themselves and/or which may be combined to reconstruct observed structures. In the present contexts, a global (i.e., offline) dictionary may be constructed once (such as based noise free patches) and subsequently used in the iterative reconstruction of other images. By way of example, with respect to offline dictionary learning (referred to herein as "global" dictionary learning) a sample process is shown in FIG. 6. In this example, a set of initial images 120 is provided and image patches are extracted in the direction or directions of interest (step 122). Sparse codes ($\alpha_s$) are calculated (step 124) as discussed above using a dictionary 70 trained offline (step 126) using noise free, similar image patches.

In addition, in the depicted example, the scan data 130 is data fitted (step 132) with respect to the initial images 120. Based on the fitted data and the calculated sparse codes, the reconstructed image x for a given iteration is updated (step 128) and the updated image serves as the initial image 120 in the next iteration. In such an implementation, calculation of the updated image is in accordance with:

$$\hat{x} = \underset{x \geq 0}{\mathrm{argmin}} \left\{ \|y - Ax\|_W^2 + \beta \sum_s \|R_s x - D\alpha_s\|^2 \right\} \quad (8)$$

subject to $\alpha_s$ being sparse (e.g., min $\|\alpha_s\|_0$ subject to $\|R_s x - D\alpha_s\|^2 < \epsilon$.

Figure 7:
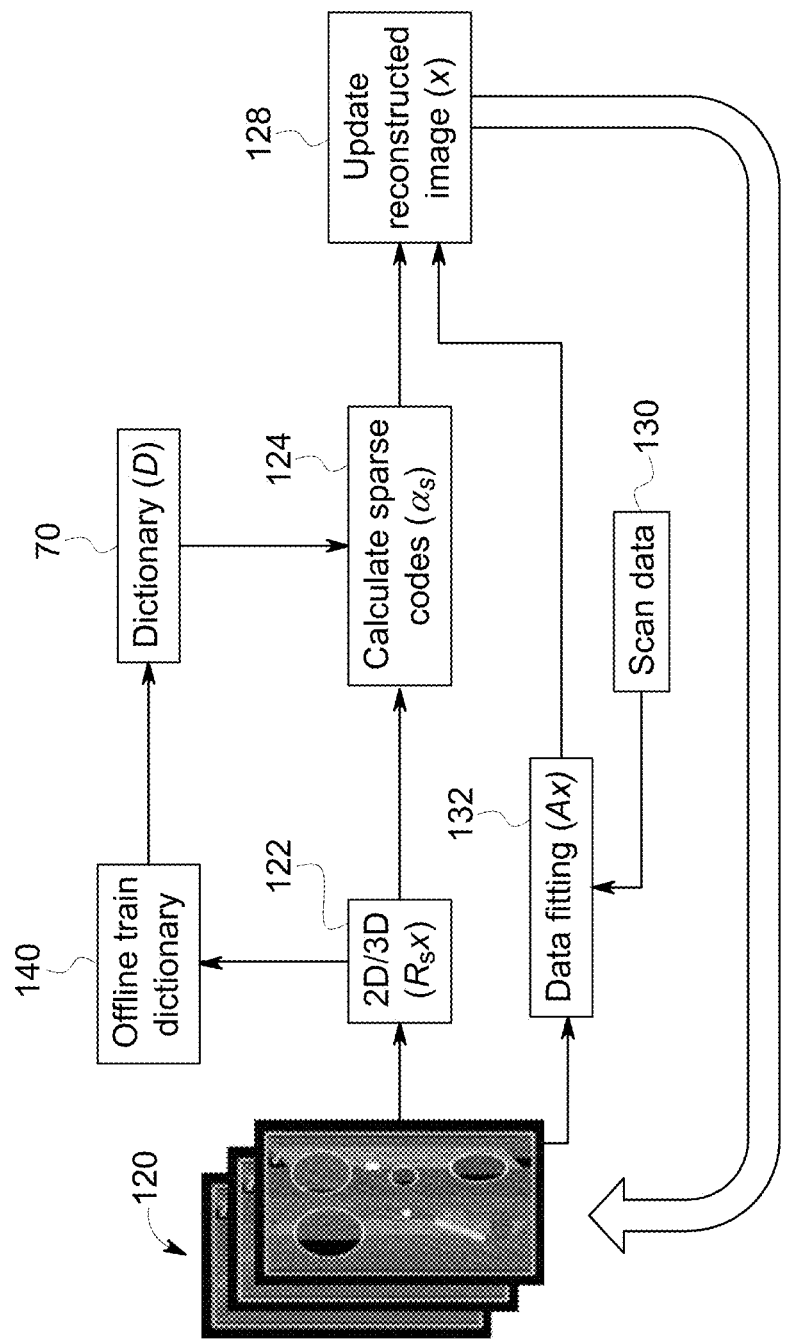
FIG. 7 depicts a process flow corresponding to an iterative reconstruction using an adaptive dictionary, in accordance with aspect of the present disclosure.

However, if no suitable global or offline dictionary is available, an adaptive or online dictionary may be employed instead, as shown with respect to FIG. 7. In such an example, the adaptive dictionary may be generated from the dataset being analyzed or reconstructed, and thus may be specific to that dataset, and may be refined or updated each iteration step, such as to improve performance or to emphasize different characteristics over time. Turning to FIG. 7, with respect to online dictionary learning (referred to herein as "adaptive" dictionary learning) a sample process is shown. In this example, a set of initial images 120 is provided and image patches are extracted in the direction or directions of interest (step 122). Sparse codes ($\alpha_s$) are calculated (step 124) as discussed above using a dictionary 70 trained offline (step 126) using noise free, similar image patches or simply using an initial dictionary calculated by Discrete Cosine Transform (DCT). In addition, in this example, the sampled patches are used to train (step 140) the dictionary 70 as part of one or more of the iteration steps.

In addition, in the depicted example, the scan data 130 is data fitted (step 132) with respect to the initial images 120. Based on the fitted data and the sparse codes calculated using the adaptive dictionary, the reconstructed image x for a given iteration is updated (step 128) and the updated image serves as the initial image 120 in the next iteration. In such an implementation, the updated image is calculated in accordance with equation (8) above.

As noted above, the present multi-dimensional or multi-directional approaches are suitable for various implementations. For example, some of the 2.5 D dictionary learning approaches discussed herein may generate or learn three different dictionaries independently, such as separately generating and maintaining an x,y dictionary, an x,z dictionary, and a y,z dictionary. In such a scenario, each directional dictionary may be learned and used independently along its respective axis and the results of the three separate reconstructions may be averaged or otherwise combined to generate the final image. Such an approach may be particularly suitable in instances where the atoms in each direction are believed to be distinct or different from one another, and would thus benefit from maintaining such distinct and separate dictionaries.

Conversely, in other scenarios the atoms identified in different dimensions may be combined, such as by combining the two or all three of the dictionaries of the previous example into a single dictionary that can be used to reconstruct along all three directions. In such an example, three separate reconstructions may still be performed (as in the preceding case), but each reconstruction is performed using the same dictionary. The three separate reconstructions may then be averaged or otherwise combined to generate the final image.

As may be envisioned, hybrid types of approaches may also be employed. For example, part of dictionary construction may involve constructing three direction specific dictionaries initially and then creating an additional dictionary having those atoms common to or seen in two-or more of direction-specific dictionaries. The direction-specific dictionary then would only have those atoms unique to a given direction or dimension. In such an approach the common dictionary and a direction-specific dictionary may be used in the reconstruction of each respective axis-specific reconstruction. Such an approach may be further refined by reformulating each direction-specific dictionary to include the common dictionary plus the respective direction-specific dictionary so that once again, there are three direction-dependent dictionaries used in the separate reconstructions, but a portion of each direction-dependent dictionary is the common dictionary. Thus, in such an approach, there would be three-direction dependent dictionaries, but they would not be independently calculated. Also, it is possible to combine all three dictionary into a single dictionary by concatenate the dictionary atoms in each direction-dependent dictionaries. In order to reduce the redundancy in the dictionary, highly correlated atoms can be merged into one by averaging them. Therefore, a compact dictionary can be formulated to further reduce the computational cost.

Experimental Results

Figure 8A:
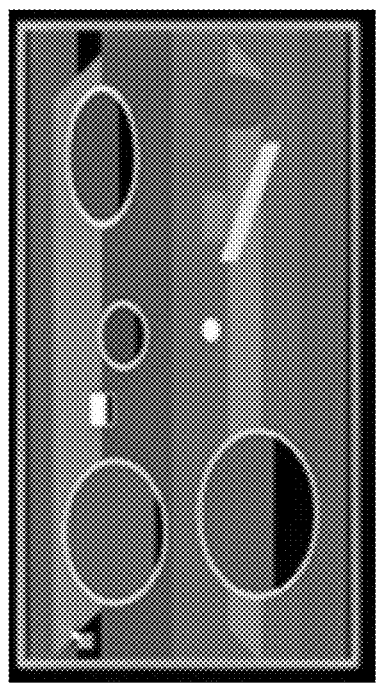
FIG. 8a depicts a baseline reconstructed image using filtered backprojection, infinite mA, and 1100 views.
Figure 8B:
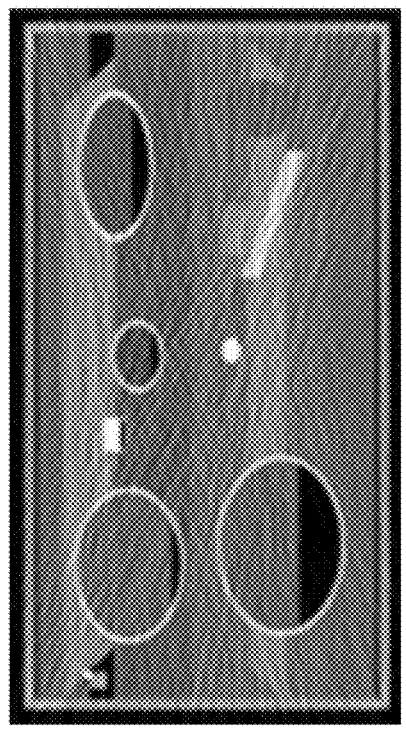
FIG. 8b depicts a reconstructed image using filtered backprojection, 20 mA, and 1100 views.
Figure 8C:
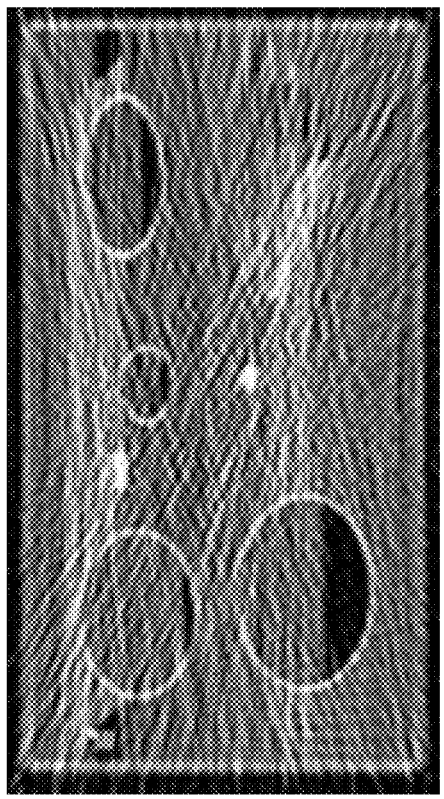
FIG. 8c depicts a reconstructed image using filtered backprojection, 20 mA, and 100 views.

With the preceding in mind, a study was performed to evaluate the effectiveness of the presently described approach. In particular, to evaluate the performance of the proposed algorithms, a simulated phantom was employed using 180 kVp and 20 mA with axial scan and generating 1100 projection views. This data was then down-sampled to 100 views, which is very challenging for reconstruction. A baseline reconstructed image (FIG. 8a, infinite mA, 1100 views)) from the infinite-dose sinogram using the filtered backprojection (FBP) algorithm was used as ground truth data for image quality comparison. FIGS. 8b and 8c shows the FBP results at different doses and for different numbers of views. As shown, low dose results in noisy reconstructed images (FIG. 8b, 20 mA, 1100 views), while a limited number of views make the results even worse (FIG. 8c, 20 mA, 100 views). The FBP results on 20 mA with 1100 and 100 views respectively (FIGS. 8a, 8b) were used as initial inputs for the proposed algorithm for reconstruction.

Computational Cost—One advantage of the proposed 2.5D dictionary learning approach is the computational efficiency compared to the three-dimensional dictionary learning. Table 1 lists the time in seconds for each algorithm in one iteration. Computation was measured on an Intel Core i5-3320M CPU with 4 cores. Note that the computational cost depends on the parameter settings, such as the step size that controls how many patches are sampled for calculation. Therefore, the computational cost is compared for different step sizes.

TABLE 1

| Step Size | x = 2, y = 2, z = 2 | | | x = 2, y = 2, z = 1 | | |
|---|---|---|---|---|---|---|
| Dimension | 2D | 3D | 2.5D | 2D | 3D | 2.5D |
| Time (s) | 36 | 174 | 70 | 36 | 340 | 106 |

In Table 1, the step size is defined for each direction (x,y,z) respectively. Smaller step size indicates a greater number of patches for calculation. Based on these results, it can be concluded that the 2.5D dictionary learning algorithm significantly saves the computational cost compared to three-dimensional dictionary learning.

Image Quality Quantitative Measurement—For quantitative evaluation of image quality, both the Peak Signal to Noise Ratio (PSNR) and Structural Similarity Index (SSIM) were used for measuring image quality. The equations for PSNR and SSIM are:

$$PSNR = 10 \log_{10}\left(\max(I) \bigg/ \sqrt{\frac{1}{mn}\sum_{i=0}^{m-1}\sum_{j=0}^{n-1}[I(i,j)-K(i,j)]^2}\right) \quad (9)$$

$$SSIM(a,b) = \frac{(2\mu_a\mu_b + c_1)(2\sigma_{ab} + c_2)}{(\mu_a^2 + \mu_b^2 + c_1)(\sigma_a^2 + \sigma_b^2 + c_2)} \quad (10)$$

$$c_1 = (0.01 \times L)\cdot{}^{\wedge}2$$

$$c_2 = (0.03 \times L)\cdot{}^{\wedge}2$$

where $\mu_a$ and $\mu_b$ are the average of patches a and b respectively, $\sigma_a$ and $\sigma_b$ are variances of a and b, $\sigma_{ab}$ is the covariance of a,b, and L is the specified dynamic range value. According to the equation, higher values of PSNR and SSIM indicate better reconstruction results. In addition, SSIM is consistent with visual perception. The quantitatively measurement results are listed in Table 2, where the FBP reconstruction results are considered as baseline.

TABLE 2

| | x = 2, y = 2, z = 2 | | | | x = 2, y = 2, z = 2 | | | |
|---|---|---|---|---|---|---|---|---|
| | 1100 views | | 100 views | | 1100 views | | 100 views | |
| | PSNR | SSIM | PSNR | SSIM | PSNR | SSIM | PSNR | SSIM |
| 2D GDL | 59.21 | 0.9703 | 51.63 | 0.9079 | 59.21 | 0.9703 | 51.63 | 0.9079 |
| 2D ADL | 58.62 | 0.9749 | 51.58 | 0.9067 | 58.62 | 0.9749 | 51.58 | 0.9067 |
| 3D GDL | 61.42 | 0.9778 | 52.25 | 0.9225 | 60.89 | 0.9791 | 52.59 | 0.9260 |
| 3D ADL | 60.36 | 0.9739 | 51.18 | 0.9208 | 60.12 | 0.9762 | 52.38 | 0.9209 |
| Hyperbola | 60.52 | 0.9725 | 52.06 | 0.9057 | 60.52 | 0.9725 | 52.06 | 0.9057 |
| FBP | 53.45 | 0.8493 | 42.31 | 0.3471 | 53.45 | 0.8493 | 42.31 | 0.3471 |
| 2.5D GDL | 62.81 | 0.9797 | 53.31 | 0.9309 | 62.97 | 0.9798 | 53.03 | 0.9302 |
| 2.5D ADL | 61.78 | 0.9781 | 53.01 | 0.9265 | 61.85 | 0.9779 | 53.05 | 0.9281 |

In Table 2 (and the results discussed below), GDL corresponds to a global dictionary learning approach where dictionaries are learned only once, such as from a reference set of images, and shared between data sets. Conversely, ADL corresponds to an adaptive dictionary learning approach in which dictionaries are generated for each data set, i.e., a custom (e.g., adapted) set of dictionaries is generated for each set of images that are reconstructed. As will be appreciated, ADL techniques are more computationally intensive than GDL techniques, which can use an existing dictionary. "Hyperbola" is a TV-like regularizer, and its result is used as reference.

Figure 9:
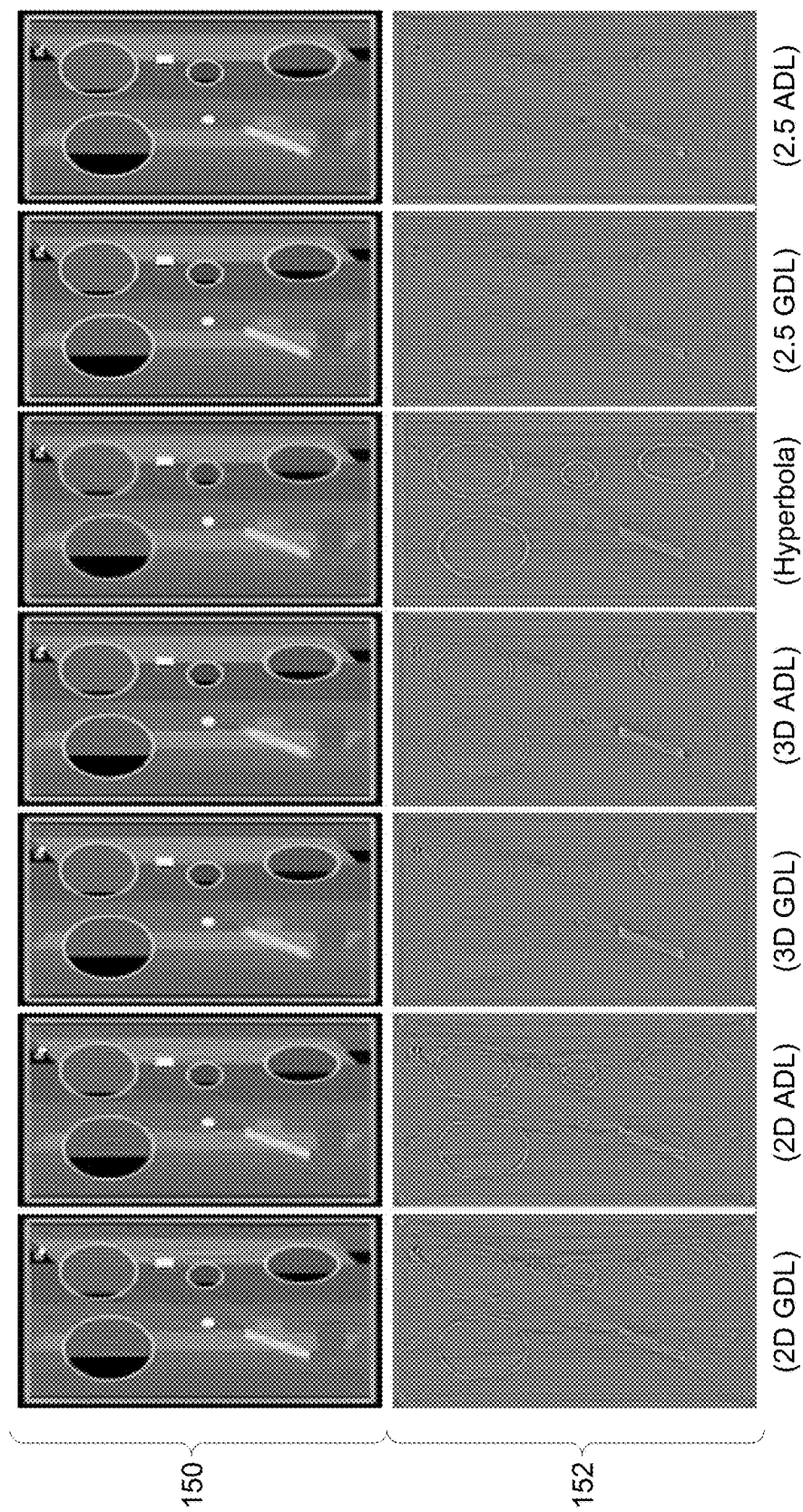
FIG. 9 depicts reconstructed images and residual images using dictionary learning approaches and based on settings used in FIG. 8b, in accordance with aspect of the present disclosure.
Figure 10:
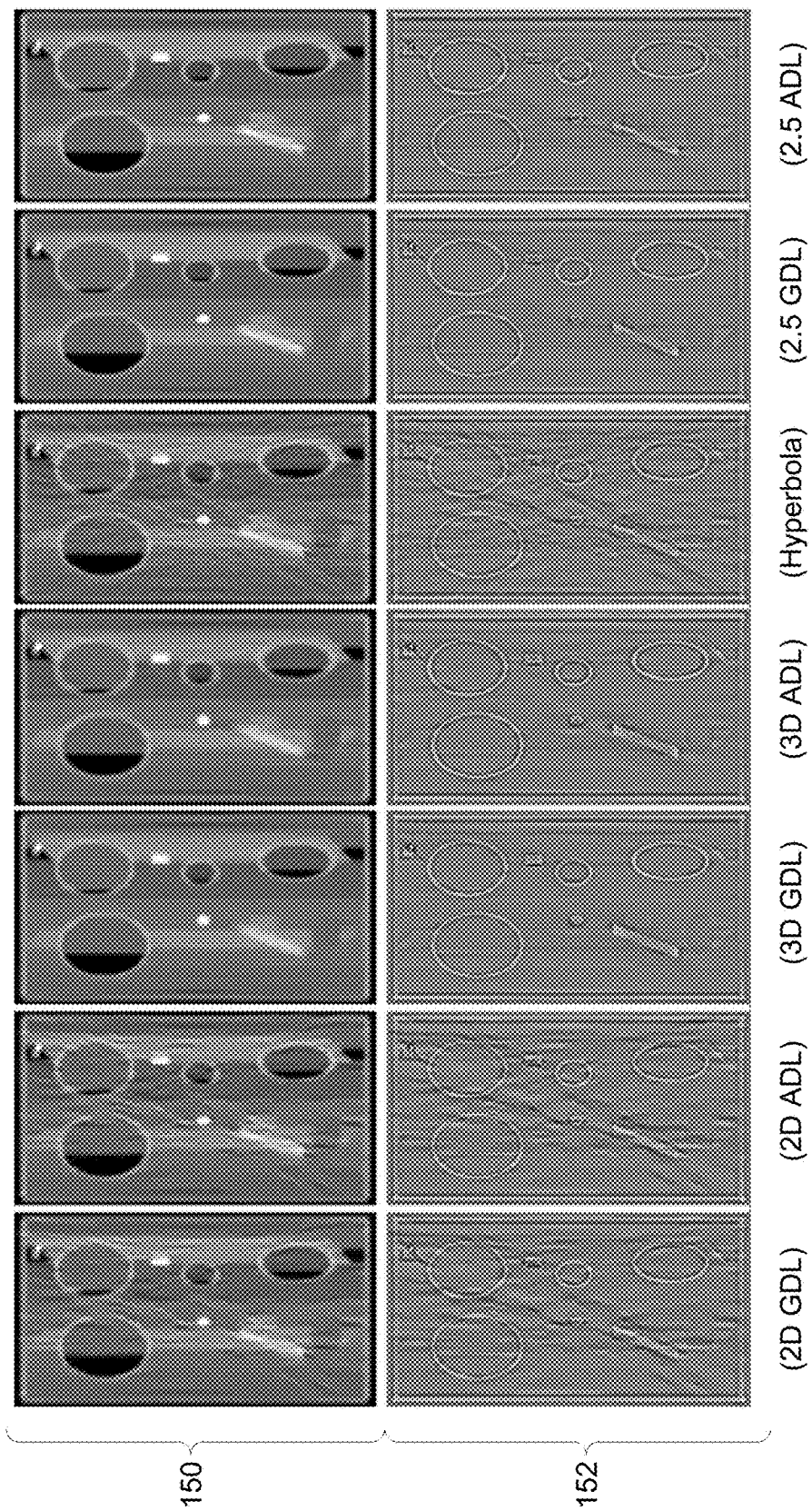
FIG. 10 depicts reconstructed images and residual images using dictionary learning approaches and based settings used in on FIG. 8*c*, in accordance with aspect of the present disclosure.

Experimental results on 1100 views and 100 views were evaluated. As shown in FIGS. 8b and 8c, the FBP results (i.e., analytical reconstruction results) contain streaks and noise and MBIR was performed on this noisy inputs. FIGS. 9 and 10 show the iteratively reconstructed images 150 (top row) and error images 152 (bottom row) using different dictionary learning algorithms on 1100 views (FIGS. 9) and 100 views (FIG. 10) respectively. Here, error images are calculated as residual images by calculating the result of the ground truth image (FIG. 8A) minus the respective reconstructed (i.e., top row) image. 2D and 3D refer to 2D and 3D dictionary learning algorithms, GDL refers to the use of a global dictionary, and ADL refers to the use of adaptive dictionaries. The PSNR and SSIM values are listed in Table 2. Note that both the results with step size as 1 and 2 in z-direction have been listed.

Low-Dose Results

Experimental results showed that the present 2.5D dictionary based reconstruction algorithms performed well on the both the 1100 views and 100 views. Compared to the FBP results, both the PSNR and SSIM values were significantly improved by using the proposed algorithm. In addition, the proposed algorithm outperforms the 2D and 3D dictionary learning algorithms on both test cases. Notably, the PSNR and SSIM values of the proposed 2.5D algorithm are even higher than three-dimensional (3D) dictionary learning. This may be attributable to the flexibility in parameter selection for the proposed algorithm. The reconstruction results in FIG. 10 show that the 2.5D dictionary learning approach is capable of reducing artifacts while retaining edge information.

A technical effect of these approaches is a computationally efficient dictionary learning-based term, such as a regularizer, in the MBIR framework to keep more spatial information than two-dimensional dictionary learning and require less computational cost than three-dimensional dictionary learning. Another advantage of the proposed 2.5D dictionary learning algorithm is the flexibility of the parameter selection. Since the images viewed from different directions are quite different, it is actually useful to use different parameters for the image blocks that correspond to different directions. However, it is not possible to realize this kind of flexibility in three-dimensional dictionary learning. Another advantage of the proposed 2.5D algorithm is that it reduces the redundancy in the learned dictionary. In the three-dimensional dictionary learning, it requires 1000 atoms to represent any 8*8*8 patch. However, there is redundant information since some atoms just have small portion of difference. In the proposed algorithm, 384 atoms will be enough to represent such patch. For the proposed other solutions in this invention, this number can be further reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A reconstruction method, comprising:
acquiring a set of projection data from a plurality of views around an imaged volume;
performing an iterative reconstruction of the set of projection data by solving an objective function comprising at least a dictionary-based term, wherein the dictionary-based term employs dictionary learning that employs two or more dictionaries each comprising at least some two-dimensional image patches oriented in different directions; and
generating a reconstructed image upon completion of the iterative reconstruction.

2. The method of claim 1, wherein the different directions comprise orthogonal directions.

3. The method of claim 1, wherein the two or more dictionaries comprises three dictionaries, wherein each dictionary comprises two-dimensional image patches corresponding to a different orthogonal direction.

4. The method of claim 1, wherein the two or more dictionaries comprise at least a common dictionary comprising two-dimensional image patches present in at least two directions and one or more direction-specific dictionaries comprising two-dimensional image patches present in only one respective direction for each direction-specific dictionary.

5. The method of claim 1, wherein the two or more dictionaries comprise two or more direction specific dictionaries, wherein each direction specific dictionary comprises both two-dimensional image patches found in multiple directions and two-dimensional image patches present in only one direction specific to the direction-specific dictionary.

6. The method of claim 1, wherein the at least one dictionary comprises an adaptive dictionary generated based on the set of projection data or images generated from the set of projection data.

7. The method of claim 1, wherein the at least one dictionary comprises a global dictionary generated based on a reference data set.

8. The method of claim 1, further comprising:
performing an initial analytic image reconstruction on all or part of the set of projection data to generate an initial image as an input to the iterative reconstruction.

9. A reconstruction method, comprising:
acquiring a set of projection data from a plurality of views around an imaged volume;
performing an iterative reconstruction of the set of projection data by solving an objective function comprising at least a dictionary-based term, wherein the dictionary-based term employs dictionary learning that employs at least one dictionary comprising two-dimensional image patches oriented in different directions; and
generating a reconstructed image upon completion of the iterative reconstruction.

10. The method of claim 9, wherein the at least one dictionary comprises a hybrid dictionary comprising both two-dimensional image patches present in at least two directions and two-dimensional image patches present in only one direction.

11. The method of claim 9, wherein the at least one dictionary comprises a single dictionary comprising two-dimensional image patches present in three orthogonal directions.

12. The method of claim 9, wherein the different directions comprise orthogonal directions.

13. The method of claim 9, wherein the at least one dictionary comprises an adaptive dictionary generated based on the set of projection data or images generated from the set of projection data.

14. The method of claim 9, wherein the at least one dictionary comprises a global dictionary generated based on a reference data set.

15. The method of claim 9, further comprising:
performing an initial analytic image reconstruction on all or part of the set of projection data to generate an initial image as an input to the iterative reconstruction.

16. An image processing system, comprising:
a memory storing one or more routines; and
a processing component configured to access previously or concurrently acquired projection data and to execute the one or more routines stored in the memory, wherein the one or more routines, when executed by the processing component:
perform an iterative reconstruction of a set of projection data by solving an objective function comprising at least a dictionary-based term, wherein the dictionary-based term employs dictionary learning that employs one or more dictionaries comprising two-dimensional image patches oriented in different directions;
generate a reconstructed image upon completion of the iterative reconstruction.

17. The image processing system of claim 16, wherein the one or more dictionaries comprise three dictionaries, wherein each dictionary comprises two-dimensional image patches corresponding to a different orthogonal direction.

18. The image processing system of claim 16, wherein the one or more dictionaries comprise at least a common dictionary comprising two-dimensional image patches present in at least two directions and one or more direction-specific dictionaries comprising two-dimensional image patches present in only one respective direction for each direction-specific dictionary.

19. The image processing system of claim 16, wherein the one or more dictionaries comprise two or more direction specific dictionaries, wherein each direction specific dictionary comprises both two-dimensional image patches found in multiple directions and two-dimensional image patches present in only one direction specific to the direction-specific dictionary.

20. The image processing system of claim 16, wherein the one or more dictionaries comprise a single dictionary comprising two-dimensional image patches representative for three orthogonal directions.

* * * * *